(No Model.)

H. W. SCATTERGOOD.
MUCILAGE POT.

No. 592,959. Patented Nov. 2, 1897.

Witnesses
J. F. Coleman
Nellie Callahan

Inventor
Henry W. Scattergood
by W. N. Finckel
Attys.

UNITED STATES PATENT OFFICE.

HENRY W. SCATTERGOOD, OF PHILADELPHIA, PENNSYLVANIA.

MUCILAGE-POT.

SPECIFICATION forming part of Letters Patent No. 592,959, dated November 2, 1897.

Application filed December 31, 1896. Serial No. 617,554. (No model.)

*To all whom it may concern:*

Be it known that I, HENRY W. SCATTERGOOD, a citizen of the United States, residing at Philadelphia, in the county of Philadelphia and State of Pennsylvania, have invented a certain new and useful Improvement in Mucilage-Pots, of which the following is a full, clear, and exact description.

The object of this invention is to construct a receptacle for mucilage, paint, varnish, and other fluids which provides for the return of the waste or surplus squeezed from the brush to the receptacle when in use, and which receptacle may be readily sealed for transportation and storage purposes.

The invention consists of a vessel having an external neck and a removable internal neck, which is spaced from the external neck and is constructed as a tube, which rises above the external neck of the vessel and is supported normally upon such position by immediate contact with the vessel, the space between the external and internal necks opening into the vessel or into the internal neck to return to the vessel any waste or surplus squeezed off of the brush upon the internal neck and running down its outside.

The invention consists also in details of construction, as hereinafter specified.

Figure 1:
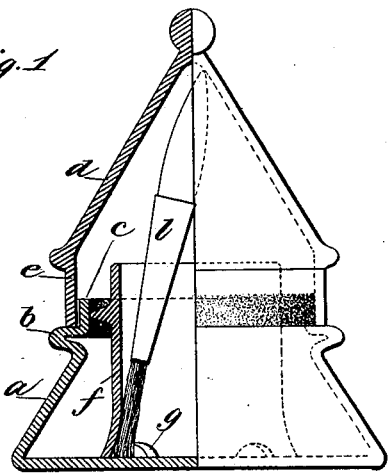
Figure 5:
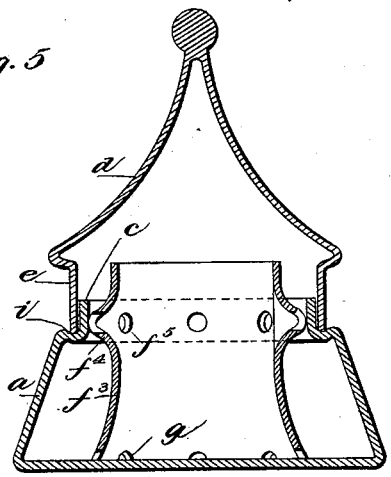
Figure 2:
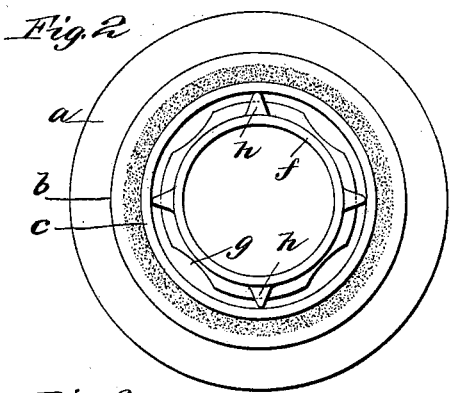
Figure 6:
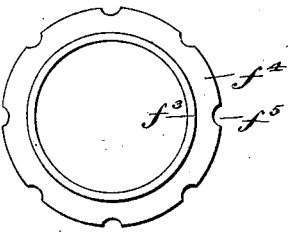
Figure 3:
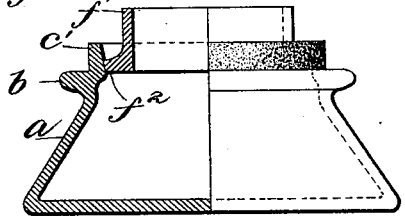
Figure 7:
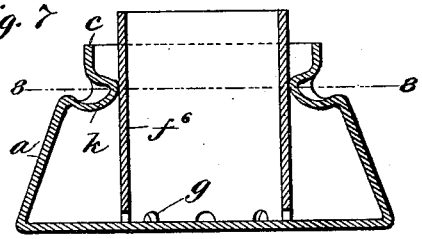
Figure 4:
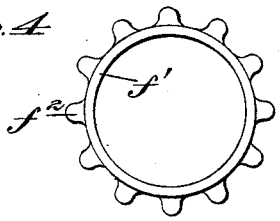
Figure 8:
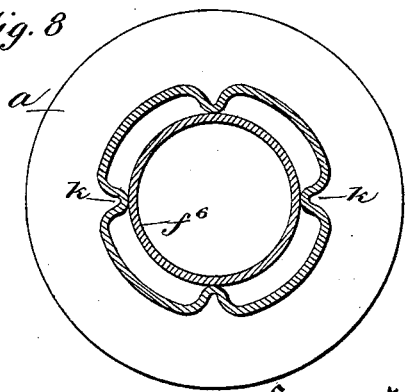

In the accompanying drawings, illustrating my invention, in the several figures of which like parts are similarly designated, Figure 1 is a half-section and elevation, and Fig. 2 is a plan view with the cover removed, of a pot constructed in accordance with one form of my invention. Fig. 3 is a half-section and elevation of another modification, and Fig. 4 is a plan view of the internal neck of Fig. 3. Fig. 5 is a vertical section of another modification, and Fig. 6 is a plan view of the internal neck of Fig. 5. Fig. 7 is a vertical section of still another modification of the vessel and internal neck, and Fig. 8 is a horizontal section taken in the plane of line 8 8, Fig. 7.

The vessel $a$ may be made of metal, glass, or other suitable material and is provided with a shoulder $b$ at the base of its neck $c$, the said neck preferably being cylindrical and the shoulder and exterior of the neck being ground, as indicated by the stippling, in order to effect a tight joint with the cover $d$. This cover has the flange $e$ concentric with the neck $c$, and said flange is adapted to be fitted about said neck with its base resting on the shoulder $b$. The flange $e$ is ground on its inner side and at its bottom edge in order to fit tight with the ground neck and shoulder of the vessel.

The vessel is provided with an internal neck $f$, made to fit within the neck $c$ and, if need be, essentially concentric therewith and projecting above said neck $c$ and extending down to the bottom of the vessel, upon which it rests, the lower portion of the internal neck being provided with openings $g$, by which communication is had between the outer vessel and the interior of the neck. This internal neck is centered and sustained within the external neck by means of teats or projections $h$, which come into contact with the neck $c$ for this purpose.

As will be observed, there is a considerable space between the necks $c$ and $f$, and this space communicates with the interior of the vessel, so that if a brush be wiped off upon the neck $f$ the surplus or waste that would inevitably run down upon the outside of the neck will enter the space between the internal and the external necks and be returned into the vessel, thus preserving the vessel from the disfigurement that results from the waste accumulating and hardening upon its outside, such accumulation, especially in the case of mucilage-pots, to which my invention is particularly applicable, oftentimes preventing the fitting of the cover to the vessel, and thus exposing the contents of the vessel to excessive evaporation.

Instead of having the internal neck extend down to and resting upon the bottom of the vessel, it may be constructed to be seated within an inwardly-tapering external neck $c'$, as in Fig. 3, and in this case the internal neck $f'$ is made with the laterally-projecting teats $f^2$, which serve to support the neck $f'$ within the neck $c'$, the spaced teats $f^2$ affording passages for the return into the vessel of the waste from the brush. Any suitable cover may be used with this form of pot, and the grinding of the first modification may be followed in this.

If a trough $i$ be made in the shoulder at the base of the neck, as in Fig. 5, then the cover may be hermetically sealed upon the vessel, a feature of importance in the packing, storing, and transportation of the pots. As also shown in Figs. 5 and 6, the internal neck $f^3$ may have a swell $f^4$ to center it within the external neck, and this swell may be provided with openings $f^5$ for return of the waste.

It is within my invention also to use a truly cylindrical internal neck $f^6$, Figs. 7 and 8, and to obtain the desired space between the external neck and the internal neck by providing the external neck with the indents $k$, although it is within my invention also to use a truly cylindrical internal neck with a vessel such as shown in the other figures of the drawings and depend upon the difference in diameter between the two to afford a space for the return of the waste or surplus from the brush.

The ground joint of Fig. 1 may be applied to any desired extent to all of these described modifications.

These and other modifications clearly are within the principle of my invention.

Any suitable brush may be employed in connection with these pots. I have shown a convenient arrangement in Fig. 1, wherein the brush $l$ may be inclosed within the cover.

I have shown and described the use of a ground joint; but I wish to be understood as not limiting my invention to such a joint, since, obviously, the grinding may be dispensed with wholly or in part. Neither is it necessary to make a tight joint between the neck and cover, and in point of fact a loose joint may be advantageous and desirable in some cases.

What I claim is—

1. A vessel, having an external neck, combined with an internal neck of less diameter and of greater height than the external neck, supported upon the bottom of the vessel and communicating with the vessel, and adapted to receive the waste or surplus from the brush and return it to the vessel from the space between itself and the external neck, substantially as described.

2. A vessel, having an external neck, and an internal neck of less diameter, normally projecting above the external neck, and supported by immediate contact with the vessel, open at both ends, and centered within the external neck by lateral projections made on the internal neck of the vessel, thereby to return the waste or surplus from the brush from outside of the said internal neck, substantially as described.

3. A vessel, having an external neck, combined with an internal neck, normally projecting above the external neck, and supported by direct contact with the vessel, open at both ends and provided with teats projected laterally into touch with the external neck, and communicating with the vessel both internally and externally, substantially as described.

4. A vessel, having an external neck, and an internal neck made as a tube resting upon the bottom of the vessel and projecting above the external neck, and having lateral projections or teats which come into contact with the inner surface of the external neck and afford passages into the vessel between the two necks, substantially as described.

5. A vessel, having an external neck, an internal neck made as a tube resting upon the bottom of the vessel and projecting above the external neck, and having lateral projections or teats which come into contact with the inner surface of the external neck and afford passages into the vessel between the two necks, an external horizontal shoulder on the vessel, and a cover resting thereon and inclosing the necks, substantially as described.

In testimony whereof I have hereunto set my hand this 30th day of December, A. D. 1896.

HENRY W. SCATTERGOOD.

Witnesses:
JOS. M. HOTTEL,
TOMS ALMGILL.

It is hereby certified that in Letters Patent No. 592,959, granted November 2, 1897, upon the application of Henry W. Scattergood, of Philadelphia, Pennsylvania, for an improvement in "Mucilage-Pots," an error appears in the printed specification requiring correction, as follows: In line 55, page 2, the word "of" should read *or*; and that the said Letters Patent should be read with this correction therein that the same may conform to the record of the case in the Patent Office.

Signed, countersigned, and sealed this 9th day of November, A. D., 1897.

[SEAL.]
WEBSTER DAVIS,
*Assistant Secretary of the Interior.*

Countersigned:
    A. P. GREELEY,
        *Acting Commissioner of Patents.*